US006643904B1

(12) United States Patent
Hedspeth

(10) Patent No.: US 6,643,904 B1
(45) Date of Patent: Nov. 11, 2003

(54) SHANK REMOVAL TOOL FOR A CARBURETOR

(76) Inventor: James D. Hedspeth, 6815 Colony Park Dr., Austin, TX (US) 78724-3703

( * ) Notice: Subject to any disclaimer, the term of this patent is extended or adjusted under 35 U.S.C. 154(b) by 0 days.

(21) Appl. No.: 10/173,090

(22) Filed: Jun. 17, 2002

Related U.S. Application Data

(63) Continuation-in-part of application No. 09/714,925, filed on Nov. 17, 2000.

(51) Int. Cl.$^7$ ................................................ B23P 19/04
(52) U.S. Cl. ............................. 29/278; 29/264; 29/280
(58) Field of Search ......................... 29/263, 264, 240, 29/240.5, 278, 280, 270; 81/441

(56) References Cited

U.S. PATENT DOCUMENTS

| 1,458,076 | A | 6/1923 | Potts |
|---|---|---|---|
| 2,053,253 | A | 9/1936 | Dennis et al. |
| 4,057,890 | A | 11/1977 | Feen |
| D259,092 | S | 5/1981 | Rolnick |
| 4,633,562 | A | 1/1987 | Ulsh |
| 4,799,832 | A | 1/1989 | Abbott |
| 5,031,487 | A | 7/1991 | Polonsky |
| 5,507,608 | A | 4/1996 | Forslind |
| 5,519,929 | A | 5/1996 | Bleckman |

*Primary Examiner*—Robert C. Watson

(57) ABSTRACT

A shank removal tool for removing a shank from a carburetor includes a sleeve having a substantially closed back end, a substantially open front end, and a perimeter wall defining an interior. The back end has a hole. A threading member has a front end portion being positioned in the sleeve and a back end portion extending from the interior of the sleeve through the hole. Tapping threads are formed on the threading member. An engaging structure is mounted on the back end portion of the threading member. The black end portion is rotatable in the hole with respect to the sleeve for permitting rotational movement of the threading member with respect to the sleeve by the engaging structure. Also, the back end portion of the threading member is axially slidable through the hole of the sleeve for permitting axial movement of the threading member with respect to the sleeve.

13 Claims, 3 Drawing Sheets

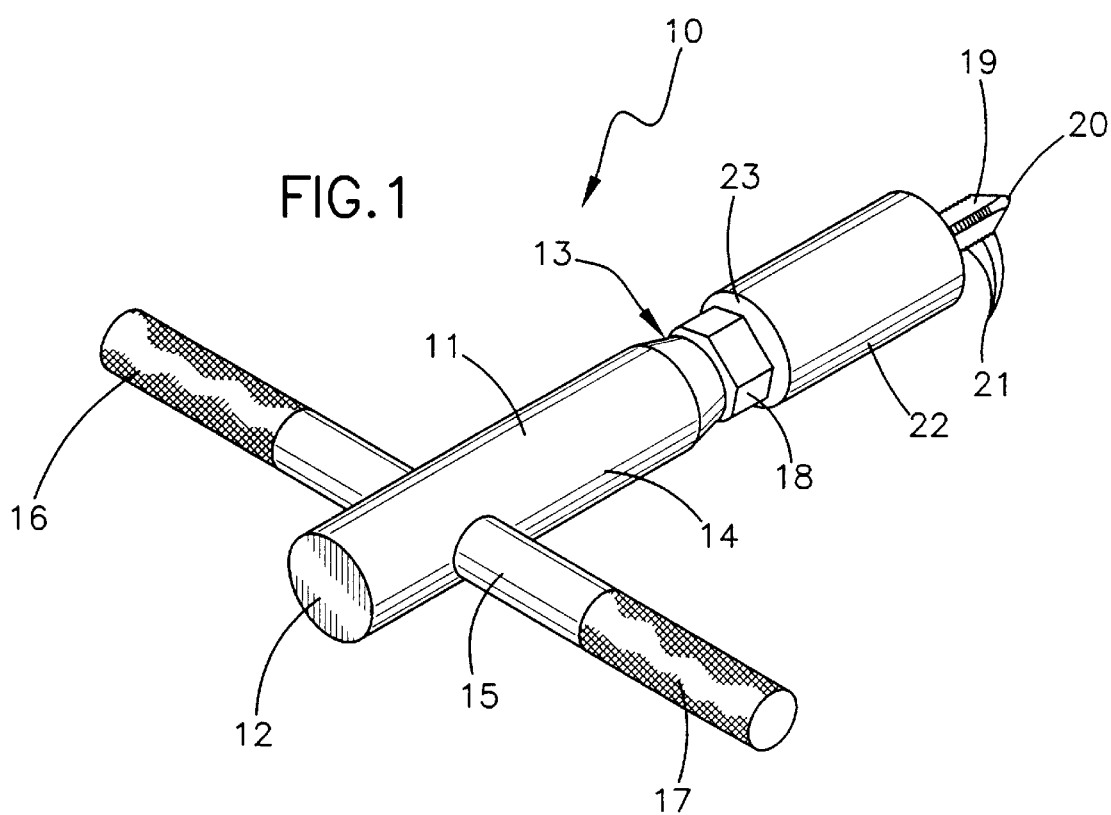

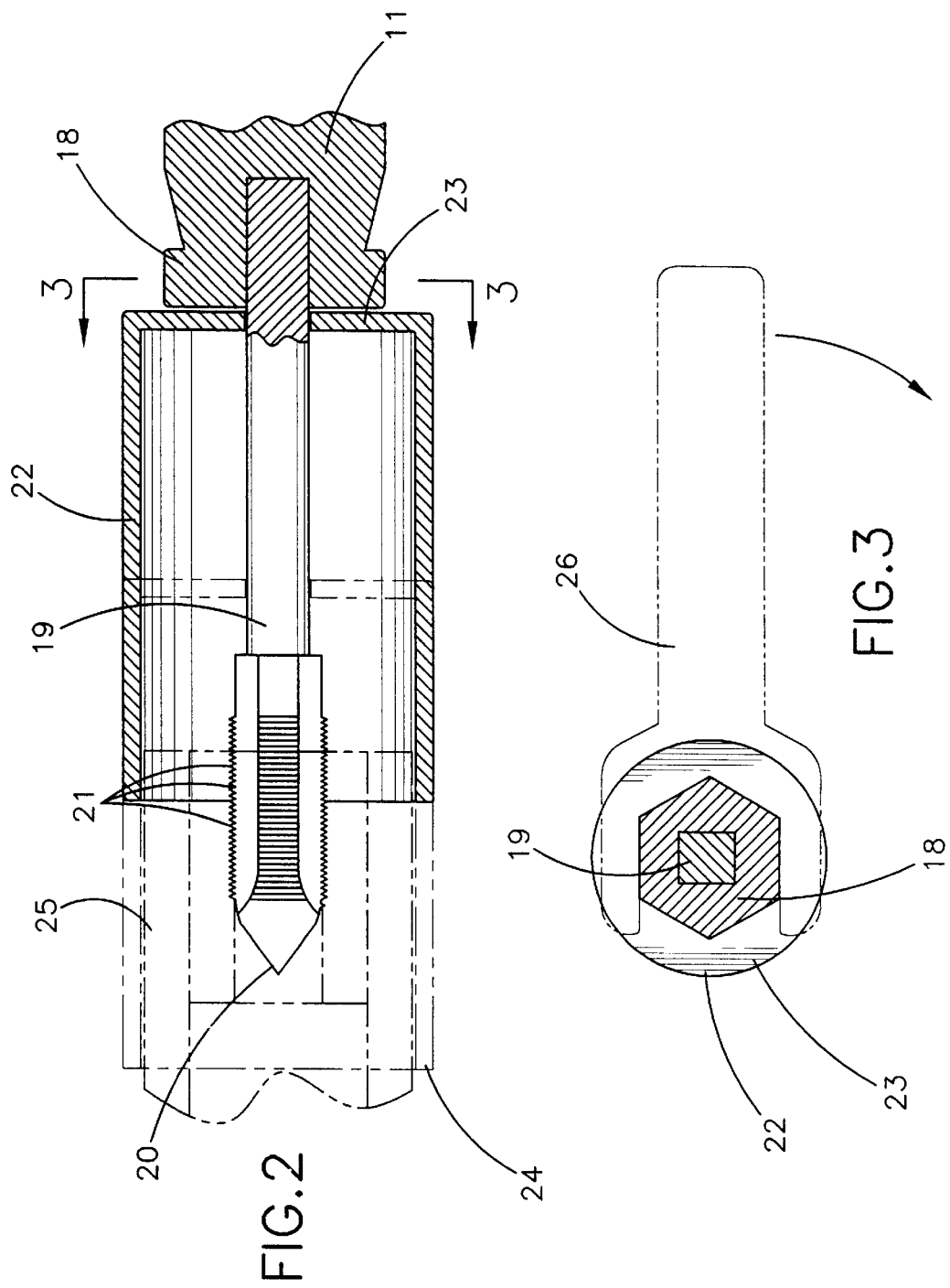

US 6,643,904 B1

SHANK REMOVAL TOOL FOR A CARBURETOR

REFERENCE TO RELATED APPLICATION

This application is a continuation-in-part of application Ser. No. 09/714,925, filed Nov. 17, 2000.

BACKGROUND OF THE INVENTION

1. Field of the Invention

The present invention relates to a carburetor shank removing tool and more particularly pertains to a new shank removal tool for a carburetor for easily removing a shank from a carburetor of a small engine.

2. Description of the Prior Art

The use of a carburetor shank removing tool is known in the prior art. More specifically, a carburetor shank removing tool heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,799,832; U.S. Pat. No. 2,053,253; U.S. Pat. No. 4,057,890; U.S. Pat. No. 5,507,608; U.S. Pat. No. 5,031,487; and U.S. Pat. No. Des. 259,092.

While these devices fulfill their respective, particular objectives and requirements, the aforementioned patents do not disclose a new shank removal tool for a carburetor. The inventive device includes a sleeve having a substantially closed back end, a substantially open front end, and a perimeter wall defining an interior. The substantially closed back end has a hole. An elongate threading member has a front end portion being positioned in the sleeve and a back end portion extending from the interior of the sleeve through the hole of the sleeve. A portion of the elongate threading member has tapping threads formed thereon for cutting internal threads. An engaging structure is positioned adjacent to the closed back end of the sleeve for abutting against the closed back end, and is mounted on the back end portion of the elongate threading portion in a manner causing movement of the threading member with the engaging structure. The back end portion of the threading member is rotatable in the hole with respect to the sleeve for permitting rotational movement of the threading member with respect to the sleeve by the engaging structure. Also, the back end portion of the threading member is axially slidable through the hole of the sleeve for permitting axial movement of the threading member with respect to the sleeve to effect plunging movement of the threading member through the interior of the sleeve by the engaging structure.

In these respects, the shank removal tool for a carburetor according to the present invention substantially departs from the conventional concepts and designs of the prior art, and in so doing provides an apparatus primarily developed for the purpose of easily removing a shank from a carburetor of a small engine.

SUMMARY OF THE INVENTION

In view of the foregoing disadvantages inherent in the known types of carburetor shank removing tool now present in the prior art, the present invention provides a new shank removal tool for a carburetor construction wherein the same can be utilized for easily removing a shank from a carburetor of a small engine.

The general purpose of the present invention, which will be described subsequently in greater detail, is to provide a new shank removal tool for a carburetor which has many of the advantages of the carburetor shank removing tool mentioned heretofore and many novel features that result in a new shank removal tool for a carburetor which is not anticipated, rendered obvious, suggested, or even implied by any of the prior art carburetor shank removing tool, either alone or in any combination thereof.

To attain this, the present invention generally comprises a sleeve having a substantially closed back end, a substantially open front end, and a perimeter wall defining an interior. The substantially closed back end has a hole. An elongate threading member has a front end portion being positioned in the sleeve and a back end portion extending from the interior of the sleeve through the hole of the sleeve. A portion of the elongate threading member has tapping threads formed thereon for cutting internal threads. An engaging structure is positioned adjacent to the closed back end of the sleeve for abutting against the closed back end, and is mounted on the back end portion of the elongate threading portion in a manner causing movement of the threading member with the engaging structure. The back end portion of the threading member is rotatable in the hole with respect to the sleeve for permitting rotational movement of the threading member with respect to the sleeve by the engaging structure. Also, the back end portion of the threading member is axially slidable through the hole of the sleeve for permitting axial movement of the threading member with respect to the sleeve to effect plunging movement of the threading member through the interior of the sleeve by the engaging structure.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new shank removal tool for a carburetor which has many of the advantages of the carburetor shank removing tool mentioned heretofore and many novel features that result in a new shank removal tool for a carburetor which is not anticipated, rendered obvious, suggested, or even implied by any of the prior art carburetor shank removing tool, either alone or in any combination thereof.

It is another object of the present invention to provide a new shank removal tool for a carburetor which may be easily and efficiently manufactured and marketed.

It is a further object of the present invention to provide a new shank removal tool for a carburetor which is of a durable and reliable construction.

An even further object of the present invention is to provide a new shank removal tool for a carburetor which is susceptible of a low cost of manufacture with regard to both materials and labor, and which accordingly is then susceptible of low prices of sale to the consuming public, thereby making such shank removal tool for a carburetor economically available to the buying public.

Still yet another object of the present invention is to provide a new shank removal tool for a carburetor which provides in the apparatuses and methods of the prior art some of the advantages thereof, while simultaneously overcoming some of the disadvantages normally associated therewith.

Still another object of the present invention is to provide a new shank removal tool for a carburetor for easily removing a shank from a carburetor of a small engine.

Yet another object of the present invention is to provide a new shank removal tool for a carburetor which includes a sleeve having a substantially closed back end, a substantially open front end, and a perimeter wall defining an interior. The substantially closed back end has a hole. An elongate threading member has a front end portion being positioned in the sleeve and a back end portion extending from the interior of the sleeve through the hole of the sleeve. A portion of the elongate threading member has tapping threads formed thereon for cutting internal threads. An engaging structure is positioned adjacent to the closed back end of the sleeve for abutting against the closed back end, and is mounted on the back end portion of the elongate threading portion in a manner causing movement of the threading member with the engaging structure. The back end portion of the threading member is rotatable in the hole with respect to the sleeve for permitting rotational movement of the threading member with respect to the sleeve by the engaging structure. Also, the back end portion of the threading member is axially slidable through the hole of the sleeve for permitting axial movement of the threading member with respect to the sleeve to effect plunging movement of the threading member through the interior of the sleeve by the engaging structure.

Still yet another object of the present invention is to provide a new shank removal tool for a carburetor that allows the user to easily and quickly remove the shank from a carburetor in order to service the small engine.

Even still another object of the present invention is to provide a new shank removal tool for a carburetor that allows the user to safely remove the carburetor shank without fear of damaging the small engine.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is liven to the following detailed description thereof. Such description makes reference to the annexed drawings wherein:

FIG. 1 is a perspective view of a new shank removal tool for a carburetor according to the present invention.

FIG. 2 is a partial detailed cross-sectional view of the present invention being extended into a shank of a carburetor.

FIG. 3 is a cross-sectional view of the present invention with a wrench.

DESCRIPTION OF THE PREFERRED EMBODIMENT

Figure 4:
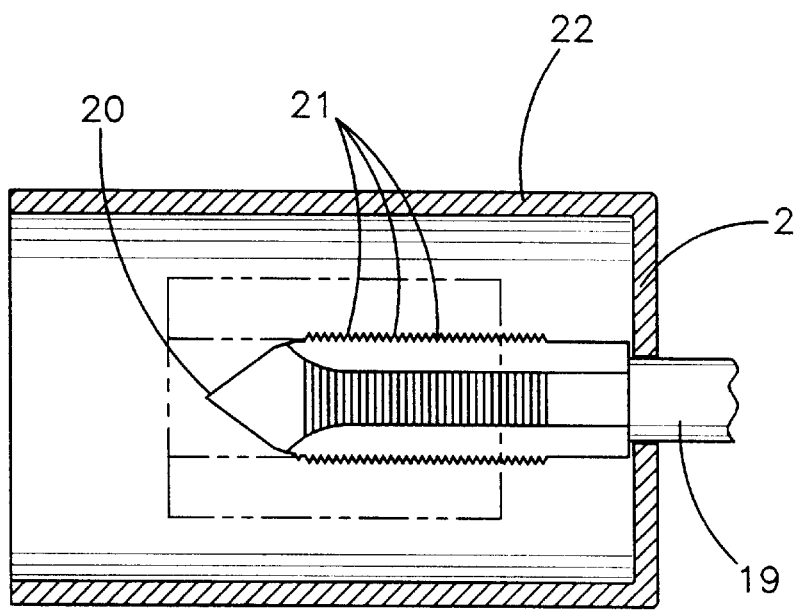
FIG. 4 is a side elevational view of the elongate threading member of the present invention.

With reference now to the drawings, and in particular to FIGS. 1 through 4 thereof, a new shank removal tool for a carburetor embodying the principles and concepts of the present invention and generally designated by the reference numeral 10 will be described.

As best illustrated in FIGS. 1 through 4, the shank removal tool for a carburetor 10 generally comprises a sleeve 22 having a substantially closed back end 23, a substantially open front end 24, and a perimeter wall that defines an interior. The substantially closed back end 23 may have a hole therethrough.

An elongate threading member 19 is provided that has a front end portion 21 that is movably positioned in the sleeve 22 and having a back end portion that extends from the interior of the sleeve 22 through the hole of the sleeve.

An engaging structure 11 is positioned adjacent to the closed back end 23 of the tubular member for abutting against the closed back end. The engaging structure 11 is mounted on the back end portion of the elongate threading member 19 in a manner for causing movement of the threading member with the engaging structure.

Significantly, the back end portion of the threading member 19 is rotatable in the hole in the closed back end with respect to the sleeve for permitting rotational movement of the threading member with respect to the sleeve 22 by the engaging structure 11. The back end portion of the threading member 19 is also slidable in a longitudinal or axial direction of the elongate threading member through the hole of the sleeve 22 for permitting plunging movement of the threading member through the interior of the sleeve by movement of the engaging structure 11. As neither the outer surface of the back end portion of the threading member 19 or the hole of the sleeve 22 is threaded (see FIGS. 2 and 4), the longitudinal plunging movement of the threading member may be accomplished with or without rotation of the threading member relative to the sleeve 22.

The engaging structure 11 may include a handle 15 with a back end 12 and a front end 13. The handle 15 may include a central portion 14 and a handle portion 16, 17 extending outwardly from the central portion. The handle portion 16, 17 may have knurled end portions extending in radially outward directions from the central portion for easy gripping by a user.

The engaging structure 11 may also includes a nut portion 18 with at least two parallel and opposite faces for being engaged with a wrench for rotating the elongate threading member to engage a shank of a carburetor.

The front end portion 21 of the elongate threading member 19 may include a pointed front end 20, and may have a plurality of tapping threads disposed thereon for tapping a threaded bore into the shank such that the front end portion in moved into the shank, and the shank is drawn into the sleeve, by rotating the elongate threading member.

In one embodiment of the invention, an outer surface of the back end portion of the threading member is smooth and cylindrical and a perimeter of the hole in the back end of the sleeve is circular to permit rotational movement and sliding movement of the threading member with respect to the sleeve.

Illustratively, the elongate threading member 19 may have a length of approximately 1½ inches, and the sleeve 22 may have a length of approximately 1 inch.

In use, the user may thread the front end portion 21 of the elongate threading member 19 into a bore in the shank 25 by turning the engaging structure using either a wrench turning the nut portion of the engaging structure, or by hand using the handle, and thus turning the attached front end portion 21. The threading of the front end portion into the shank advances the shank toward and into the interior of the sleeve, or, taken from a different perspective, pulls the sleeve toward the shank. As this occurs, the front end of the sleeve engages a portion of the carburetor in which the shank is lodged that is positioned about the shank. At the point of engagement, further turning of the engaging structure and the elongate threading member pulls the shank into the sleeve and out of the carburetor, as the abutment of the back end of the sleeve against the engaging structure (e.g., the nut portion 18) stops the sleeve from also moving with the advancing shank.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A shank removal tool for a carburetor comprising:
    a sleeve having a substantially closed back end, a substantially open front end, and a perimeter wall defining an interior, the substantially closed back end having a hole therethrough;
    an elongate threading member having a front end portion being positioned in the sleeve and having a back end portion extending from the interior of the sleeve through the hole of the sleeve, a portion of the elongate threading member having tapping threads formed thereon for cutting internal threads;
    an engaging structure being positioned adjacent to the closed back end of the sleeve for abutting against the closed back end, the engaging structure being mounted on the back end portion of the elongate threading portion in a manner causing movement of the threading member with the engaging structure;
    wherein the back end portion of the threading member is rotatable in the hole with respect to the sleeve for permitting rotational movement of the threading member with respect to the sleeve by the engaging structure, the back end portion of the threading member having a smooth exterior so as to be freely slidable in a longitudinal direction of the threading member through the hole of the sleeve for permitting axial movement of the threading member with respect to the sleeve to effect plunging movement of the threading member through the interior of the sleeve by the engaging structure.

2. The tool of claim 1 wherein the engaging structure comprises a handle.

3. The tool of claim 2 wherein the handle includes a central portion and a handle portion extending outwardly from the central portion.

4. The tool of claim 2 wherein the handle portion comprises a pair of end portions extending in radially outward directions from the central portion.

5. The tool of claim 1 wherein the engaging structure includes a nut portion with at least two parallel and opposite faces for being engaged with a wrench for rotating the engaging structure and the elongate threading member.

6. The tool of claim 1 wherein the front end portion of the elongate threading member includes a pointed front end for guiding the threading member into an interior of the shank.

7. A shank removal tool for a carburetor comprising:
    a sleeve having a substantially closed back end, a substantially open front end, and a perimeter wall defining an interior, the substantially closed back end having a hole therethrough;
    an elongate threading member having a front end portion being positioned in the sleeve and having a back end portion extending from the interior of the sleeve through the hole of the sleeve, a portion of the elongate threading member having tapping threads formed thereon for cutting internal threads;
    an engaging structure being positioned adjacent to the closed back end of the sleeve for abutting against the closed back end, the engaging structure being mounted on the back end portion of the elongate threading portion in a manner causing movement of the threading member with the engaging structure;
    wherein the back end portion of the threading member is rotatable in the hole with respect to the sleeve for permitting rotational movement of the threading member with respect to the sleeve by the engaging structure, the back end portion of the threading member being axially slidable through the hole of the sleeve for permitting axial movement of the threading member with respect to the sleeve to effect plunging movement of the threading member through the interior of the sleeve by the engaging structure;
    wherein the engaging structure comprises a handle including a central portion and a handle portion extending outwardly from the central portion, the handle portion comprising a pair of end portions extending in radially outward directions from the central portion;

wherein the engaging structure includes a nut portion with at least two parallel and opposite faces for being engaged with a wrench for rotating the engaging structure and the elongate threading member;

wherein the front end portion of the elongate threading member includes a pointed front end for guiding the threading member into an interior of the shank.

8. A shank removal tool for a carburetor comprising:

a sleeve having a substantially closed back end, a substantially open front end, and a perimeter wall defining an interior, the substantially closed back end having a hole therethrough;

an elongate threading member having a front end portion being positioned in the sleeve and having a back end portion extending from the interior of the sleeve through the hole of the sleeve, a portion of the elongate threading member having tapping threads formed thereon for cutting internal threads;

an engaging structure being positioned adjacent to the closed back end of the sleeve for abutting against the closed back end, the engaging structure being mounted on the back end portion of the elongate threading portion in a manner causing movement of the threading member with the engaging structure;

wherein the back end portion of the threading member is rotatable in the hole with respect to the sleeve for permitting rotational movement of the threading member with respect to the sleeve by the engaging structure, the back end portion of the threading member being axially slidable through the hole of the sleeve for permitting axial movement of the threading member with respect to the sleeve to effect plunging movement of the threading member through the interior of the sleeve by the engaging structure;

wherein the engaging structure includes a nut portion with at least two parallel and opposite faces for being engaged with a wrench for rotating the engaging structure and the elongate threading member.

9. The tool of claim 8 wherein the engaging structure comprises a handle.

10. The tool of claim 9 wherein the handle includes a central portion and a handle portion extending outwardly from the central portion.

11. The tool of claim 9 wherein the handle portion comprises a pair of end portions extending in radially outward directions from the central portion.

12. The tool of claim 8 wherein the front end portion of the elongate threading member includes a pointed front end for guiding the threading member into an interior of the shank.

13. The tool of claim 1 wherein the exterior of the back end portion of the elongate threading member is free of threads and an interior of the hole is free of threads to facilitate sliding of the back end portion of the threading member through the hole of the sleeve.

* * * * *